Sept. 9, 1958  E. R. R. GREIFENSTEIN  2,851,317
PISTON WITH RING GROOVE
Filed Feb. 13, 1956

INVENTOR
EMILE R. R. GREIFENSTEIN

United States Patent Office 2,851,317
Patented Sept. 9, 1958

2,851,317
PISTON WITH RING GROOVE PROTECTING DEVICE

Emile Raymond René Greifenstein, Levallois-Perret, France

Application February 13, 1956, Serial No. 565,234

Claims priority, application France March 9, 1955

3 Claims. (Cl. 309—14)

The light alloy pistons that are used in internal combustion engines have the disadvantage of wearing away along their ring grooves owing to the fact that these rings, by rubbing along the walls of the cylinders, pound the metal which is more malleable owing to the high temperature prevailing in the cylinders of an engine.

Sometimes a hard metal washer is inserted between the upper edge of the groove and the ring, but the lower edge cannot be protected by a simple washer on account of the gases under pressure which penetrate into the groove, bearing against the end of the latter and thrusting the lower washer against the walls of the cylinders which speedily become worn, as well as the washer.

This invention obviates these disadvantages by producing a protecting device for both the upper and lower edges of piston grooves which is efficient, because this protecting device cannot be displaced by the thrust of gases.

According to the invention, the protecting device for light alloy piston grooves consists of two washers respectively placed against the upper and lower edges of piston grooves and locked in the latter so that these washers cannot possibly bear against the walls of the cylinder in which the piston works.

Various other characteristics of the invention will furthermore be revealed in the detailed description which follows.

Forms of embodiment of the purpose of the invention are shown, by way of examples, in the attached drawing.

Figure 1:
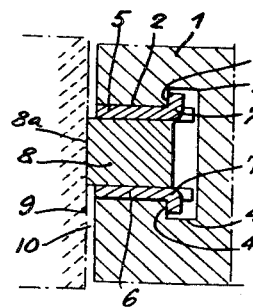
Figure 1 is a fragmentary cross-sectional view taken radially through a piston provided with a groove protecting device in accordance with the present invention, the section through the device being at its locking point.

In Figure 1, the piston 1 comprises a ring groove 2 whose internal part has two supplementary recesses 3, 4. Two washers 5, 6 are respectively placed against the upper and lower faces of the groove 2. These washers 5 and 6 are each made of a flat circular strip so shaped that the ends meet in such manner that gases cannot get past the cut. Studs 7 are struck from the internal circular edge of the strip and turned down at right angles, so as to hook into the flange 3a, 4a of the recesses 3 or 4 made in the end of the groove 2 of the piston 1.

A piston ring 8 is engaged between the two strips 5, 6 and bears, by its outer periphery 8a, against the walls 9 of the cylinder 10. Thus the two strips 5, 6 are locked in the groove 2, and in spite of the strain exerted by the gases under pressure on the rear parts of the washers 5, 6, the latter cannot move parallel to the piston ring 8 in the direction of the walls 9 of the cylinder 10, because the studs 7 hold the strips 5, 6 in a suitable position.

Figure 3:
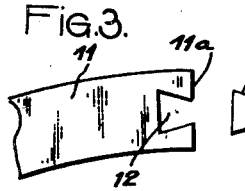
Figure 3 is a fragmentary plan view of the locking means of one of the elements of the device.

In Figure 3, the strip 11 comprises a dove-tail notch 12 at its end 11a, into which fits a dovetail tongue element 13 which is integral with the end 11b of the strip 11.

When this strip is in position in the groove of a piston, the tongue element 13 is inserted in the notch 12, so that this strip is locked in the groove and cannot be thrust on the periphery of the piston. The internal diameter of the ring formed by the strip 11 is slightly greater than the internal diameter of the piston groove.

Figure 4:
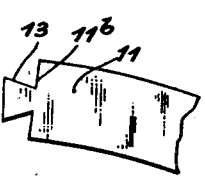
Figure 4 is a fragmentary plan view of a device with a modified locking ararngement.
Figure 4:
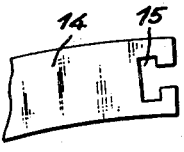
Figure 4:
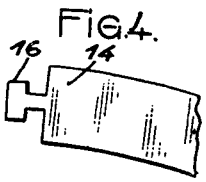
Figure 5:
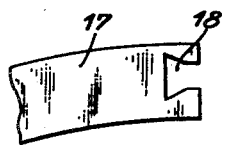
Figure 5 is a fragmentary plan view of a device with a further modification of the locking device.

In Figure 4, the strip 14 comprises at each end, a T-shaped notch 15 and a complementary tongue element 16 cooperative in the same manner as the notch and tongue elements 12, 13 of Figure 3. This also applies to the strip 17 shown in Figure 5, whose notch and tongue elements 18, 19 interfit when the strip is placed in the piston groove.

Figure 6:
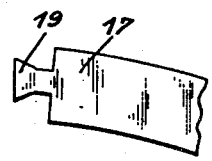
Figure 6 is a fragmentary plan view of a device with still another modification of the locking device.
Figure 6:
Figure 2:
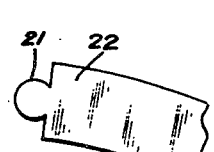
Figure 2 is a fragmentary perspective view of an element forming the protecting device.
Figure 2:
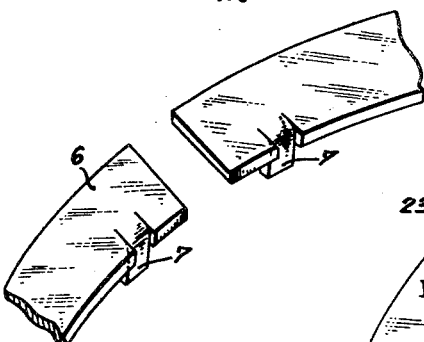

In Figure 6, the notch and tongue elements 20, 21 for locking the strip 22 are circular in shape.

Figure 7:
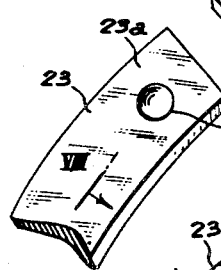
Figure 7 is a fragmentary plan view of a device with yet another modification of the locking device.
Figure 8:
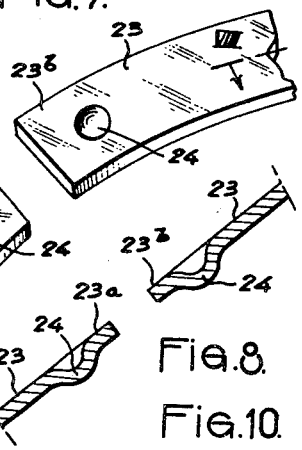
Figure 8 is a fragmentary cross-sectional view taken along the line VIII—VIII of Figure 7.
Figure 8:
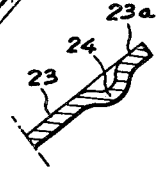

In Figure 7, the strip 23 comprises, at its ends 23a, 23b, two punched detents 24 which penetrate into recesses in the upper and lower faces of the piston grooves.

Figure 9:
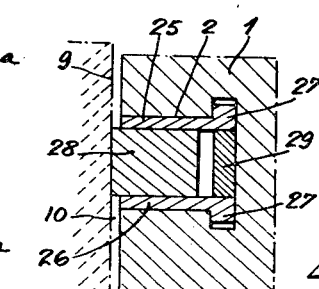
Figure 9 is a fragmentary cross-sectional view similar to Figure 1, and of a piston whose groove is provided with a protecting device according to one alternative arrangement.

In Figure 9, the strips 25, 26 comprise a circular flange 27. A piston ring 28 is inserted between the two strips 25, 26 which are, moreover, braced at their rear part by a spacer collar nested in the bottom of the groove 29.

Figure 10:
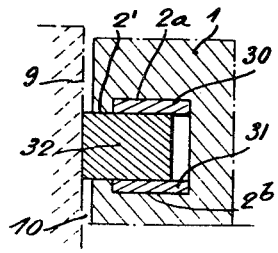
Figure 10 is a fragmentary cross-sectional view similar to Figure 1, and of a piston provided with a groove protecting device according to a third alternative arrangement.

In Figure 10, the sides of the groove 2' of the piston 1 have annular recesses 2a, 2b in which two washers 30, 31 are respectively seated. 32 designates a piston ring bearing at its periphery against the wall 9 of the cylinder 10.

The strips forming the protecting elements of the edges of piston groove being made of a hard metal or alloy, they protect the piston 1 which is of light alloy and prevent the latter from being distorted by the piston rings 8, 28 or 32. Pistons are thus obtained whose ring grooves do not wear out, and the life of such pistons is much longer than formerly.

The washers forming the protecting elements for piston groove edges can be either of steel, cast iron, or any other suitable material. Their surfaces acn be totally or partially treated or covered with an anti-friction or stainless body such as chromium, cadmium, etc.

To prevent shrinking arising from a high working temperature, the protecting washers are preferably stabilised before being fitted.

The invention also relates to pistons whose grooves are protected by these washers.

In the foregoing, pistons have been dealt with for internal combustion engines, but such pistons can also be used in compressors, pumps or other similar machines.

Various other modifications can be applied to the forms of embodiment, given by way of examples, without going outside the scope of the invention.

I claim:

1. In combination with a piston having a peripheral ring groove, a piston ring in said groove, a unitary split washer interposed between each side of said ring and the adjacent side wall of said groove, said washers being of a size to fit wholly within said groove, the ends of each of said washers being substantially in end abutment, and means securing said washer ends together and locking said washers in said groove and preventing expansion of said washers beyond the periphery of said piston.

2. In combination with a piston having a peripheral ring groove, a piston ring in said groove, a unitary split washer interposed between each side of said ring and the adjacent side wall of said groove, said washers being of a size to fit wholly within said groove, the ends of each of said washers being substantially in end abutment, and means securing said washer ends together and locking said washers in said groove and preventing expansion of said washers beyond the periphery of said piston, said means including a notch in one end of each washer and a tongue on the other end and fitted in said notch.

3. In combination with a piston having a peripheral ring groove, a piston ring in said groove, a unitary split washer interposed between each side of said ring and the adjacent side wall of said groove, said washers being of a size to fit wholly within said groove, the ends of each of said washers being substantially in end abutment, and means securing said washer ends together and locking said washers in said groove and preventing expansion of said washers beyond the periphery of said piston, said means including a notch in one end of each washer and a tongue on the other end and fitted in said notch, said notch and tongue being complementary and shaped to lock the ends of each washer together.

References Cited in the file of this patent

UNITED STATES PATENTS

| 1,172,678 | Davidson | Feb. 22, 1916 |
| 1,271,077 | Probasco | July 2, 1918 |
| 1,667,941 | Madsen | May 1, 1928 |
| 2,337,997 | Hiromi et al. | Dec. 28, 1943 |
| 2,564,025 | Morton | Aug. 14, 1951 |
| 2,630,358 | Stevens | Mar. 3, 1953 |
| 2,755,151 | Daub | July 17, 1956 |

FOREIGN PATENTS

| 505,263 | France | 1920 |
| 1,066,931 | France | Jan. 27, 1954 |
| 619,877 | Germany | Oct. 9, 1935 |